March 3, 1959

J. R. URSCHEL 2,875,800

MEAT COMMINUTING MACHINE

Filed June 20, 1956

INVENTOR.
Joe R. Urschel
BY
Atty.

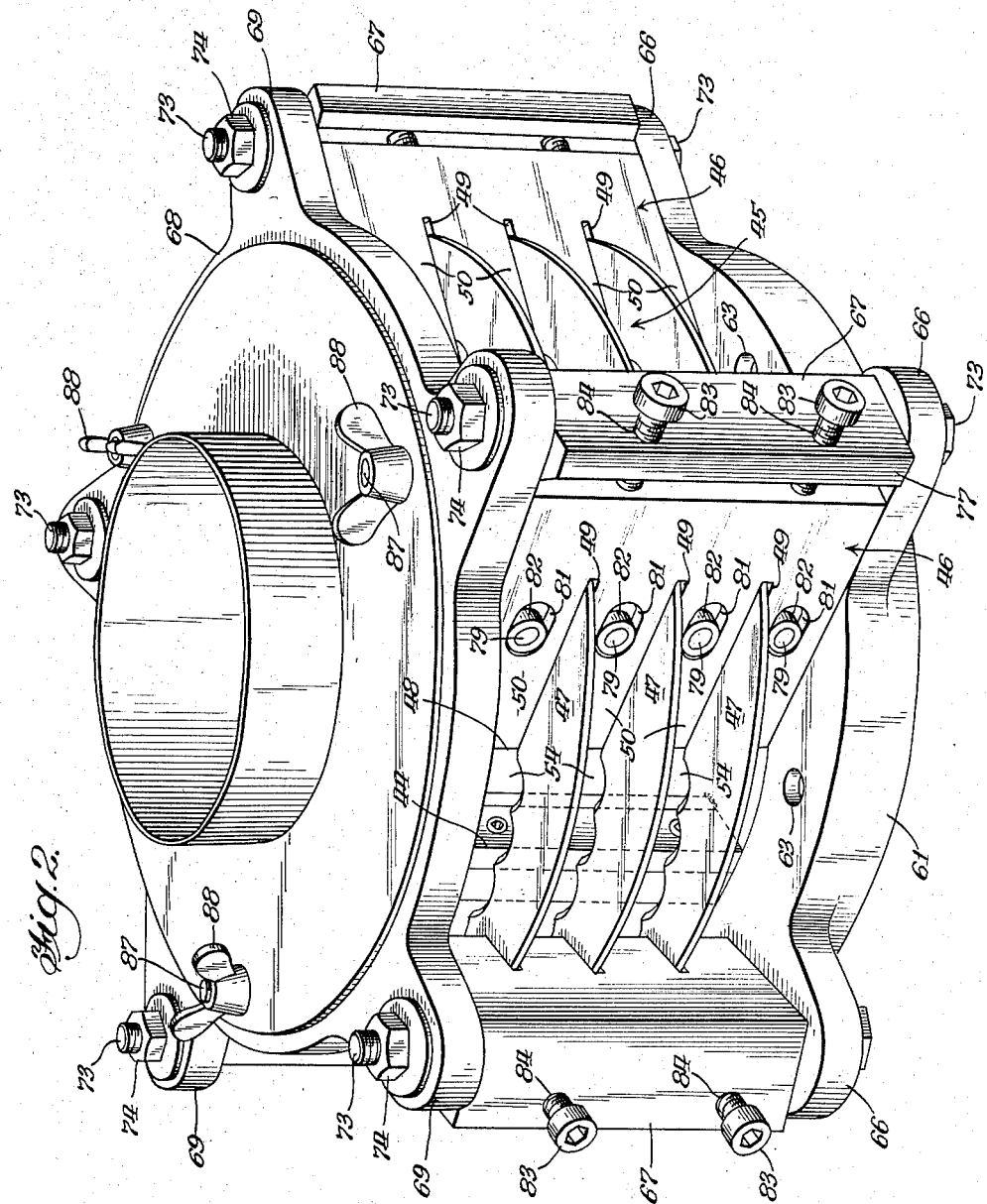

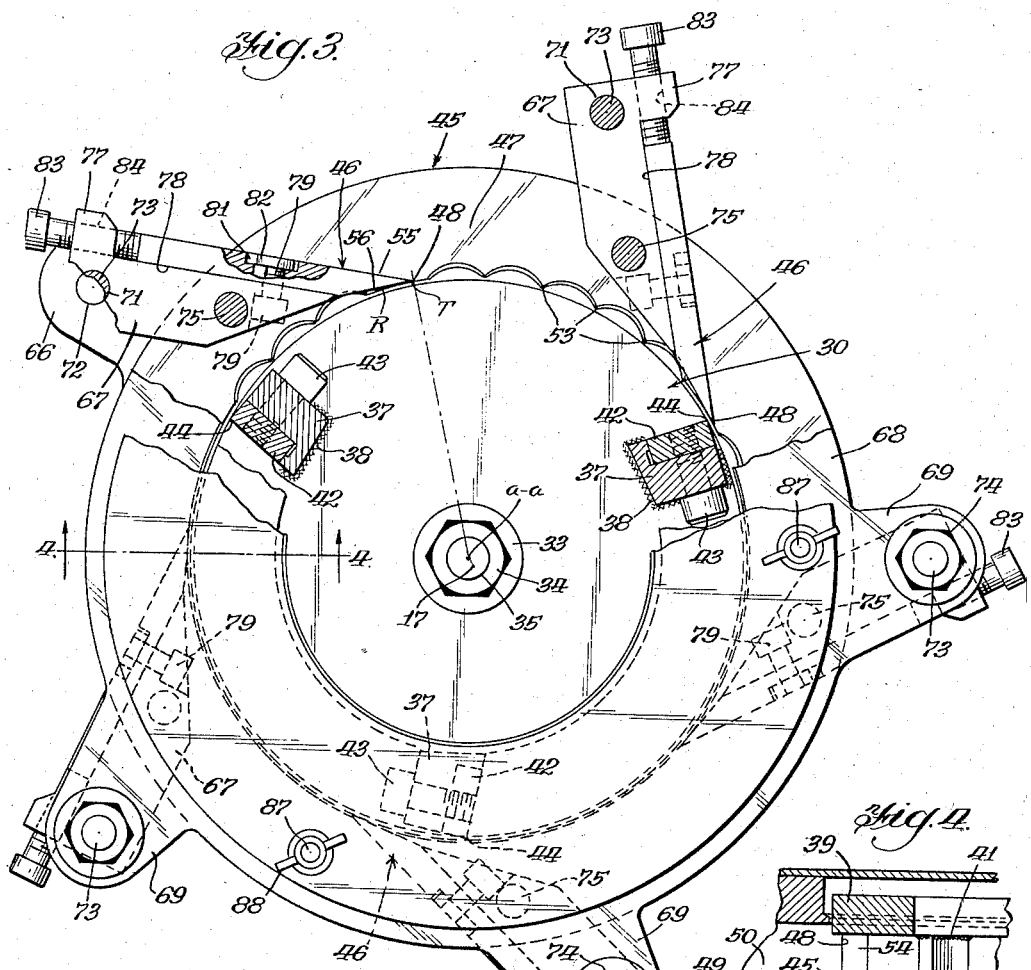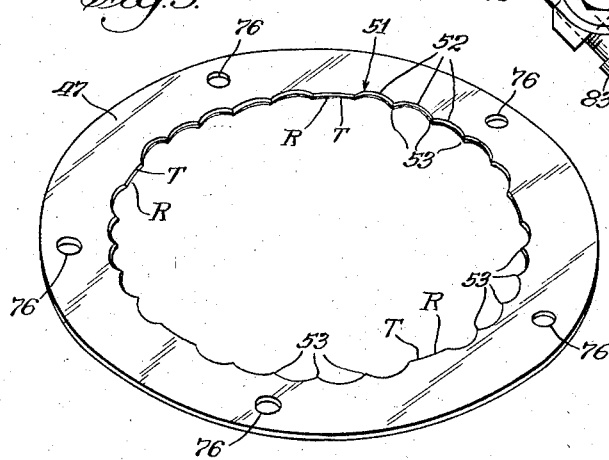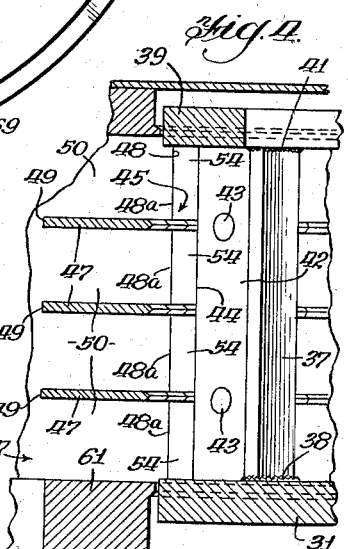

March 3, 1959      J. R. URSCHEL      2,875,800
MEAT COMMINUTING MACHINE
Filed June 20, 1956      6 Sheets-Sheet 5
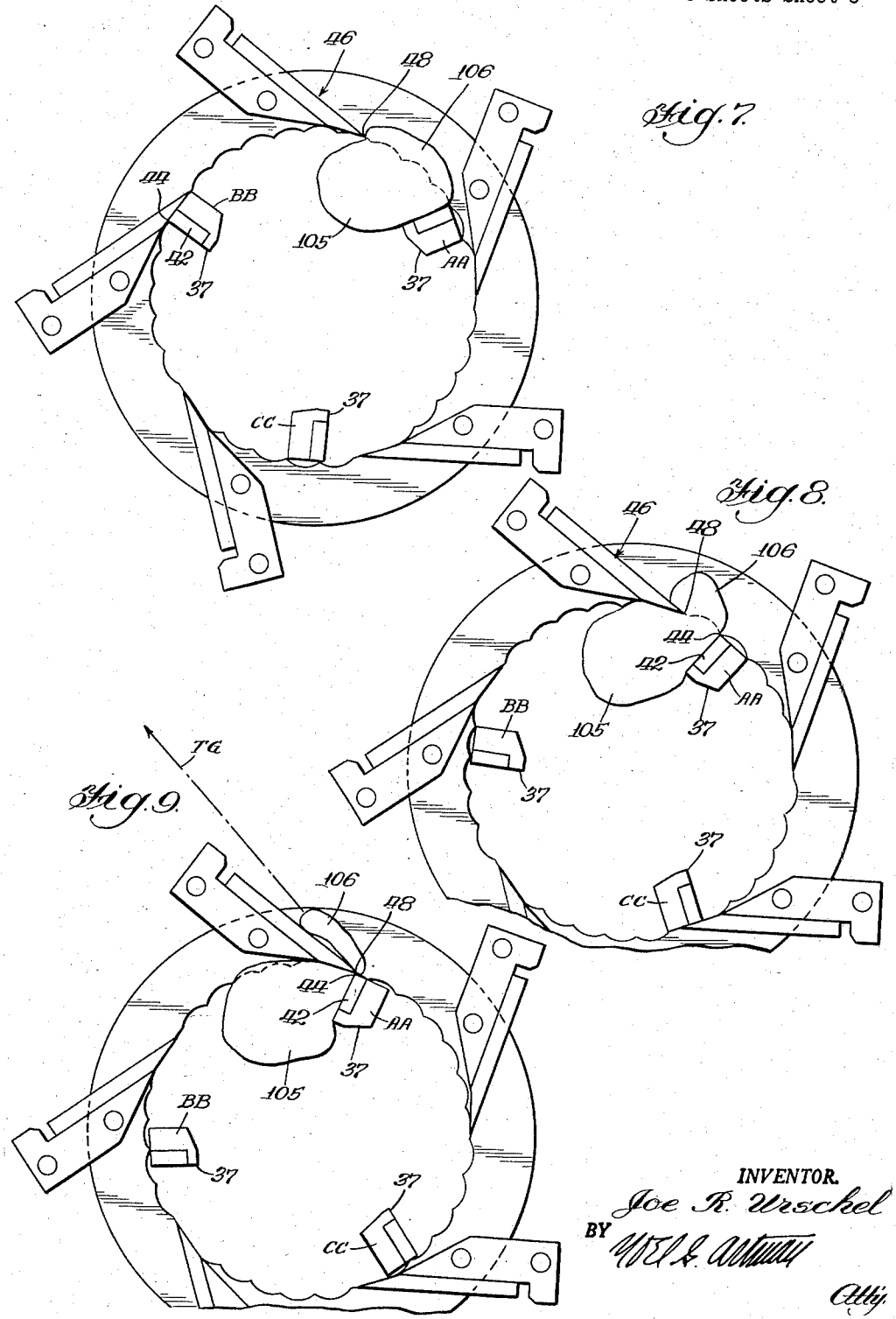
INVENTOR.
Joe R. Urschel

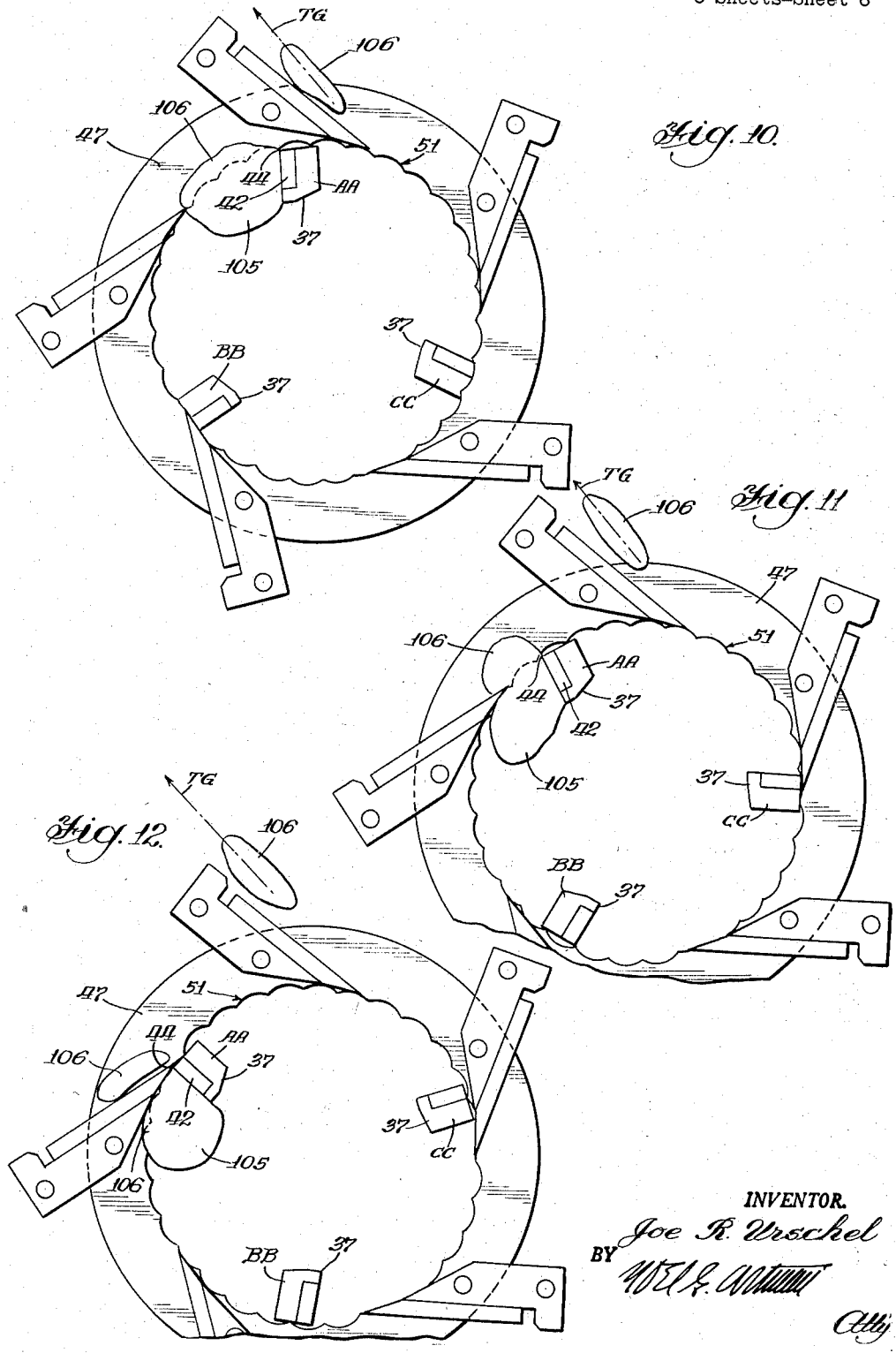

United States Patent Office 2,875,800
Patented Mar. 3, 1959

2,875,800

MEAT COMMINUTING MACHINE

Joe R. Urschel, Valparaiso, Ind.

Application June 20, 1956, Serial No. 592,596

15 Claims. (Cl. 146—192)

This invention has to do with machines for cutting sliceable material into fragments and relates more particularly to a machine comprising a rotor chamber wherein the material is revolved while centrifugally pressed radially outwardly against a chamber side wall having cutting edges for cutting the revolved material into fragments, and side wall openings disposed between such cutting edges and through which the fragments are discharged.

The general object of this invention is the provision in a material comminuting machine of a rotor chamber of which the inner periphery is composed substantially of a grid of knife edges of which part extend circumferentially of the chamber and part axially thereof to minimize sliding contact between the material and the chamber wall during the cutting operation. This diminishes the energy required to operate the machine, but more significantly, when the processed material is meat, avoids the development of friction heat therein which would deteriorate its bright red color. The exemplary species of machine herein shown is particularly adapted for cutting meat chunks up to 1½ lbs. more or less into smaller pieces suitable for stew cooking. It is contemplated, however, that the knife-edge grid in the chamber wall can be made of finer mesh to adapt the machine for cutting the meat into fragments massed into a finished product corresponding to hamburger grind.

The above and other desirable objects inherent in and encompassed by the invention are elucidated in the ensuing description, the appended claims and the annexed drawings, wherein:

Fig. 2 is an enlarged perspective view of the chamber of the machine for receiving the material to be cut thereby into fragments.

Fig. 3 is plan view of the material receiving chamber, with parts broken away for exposing other parts and with two of the rotor impeller elements shown in horizontal section.

Fig. 4 is a vertical fragmentary sectional view taken through the chamber wall at the plane indicated by the line 4—4 in Fig. 3.

Fig. 5 is a perspective view of one of the chamber-circumscribing knife structures used in the chamber wall.

Figs. 7 through 12 are diagrammatic views showing successive stages in the operation of the rotor and rotor chamber during an operating cycle of 120 degrees rotation of the rotor.

Figure 1:
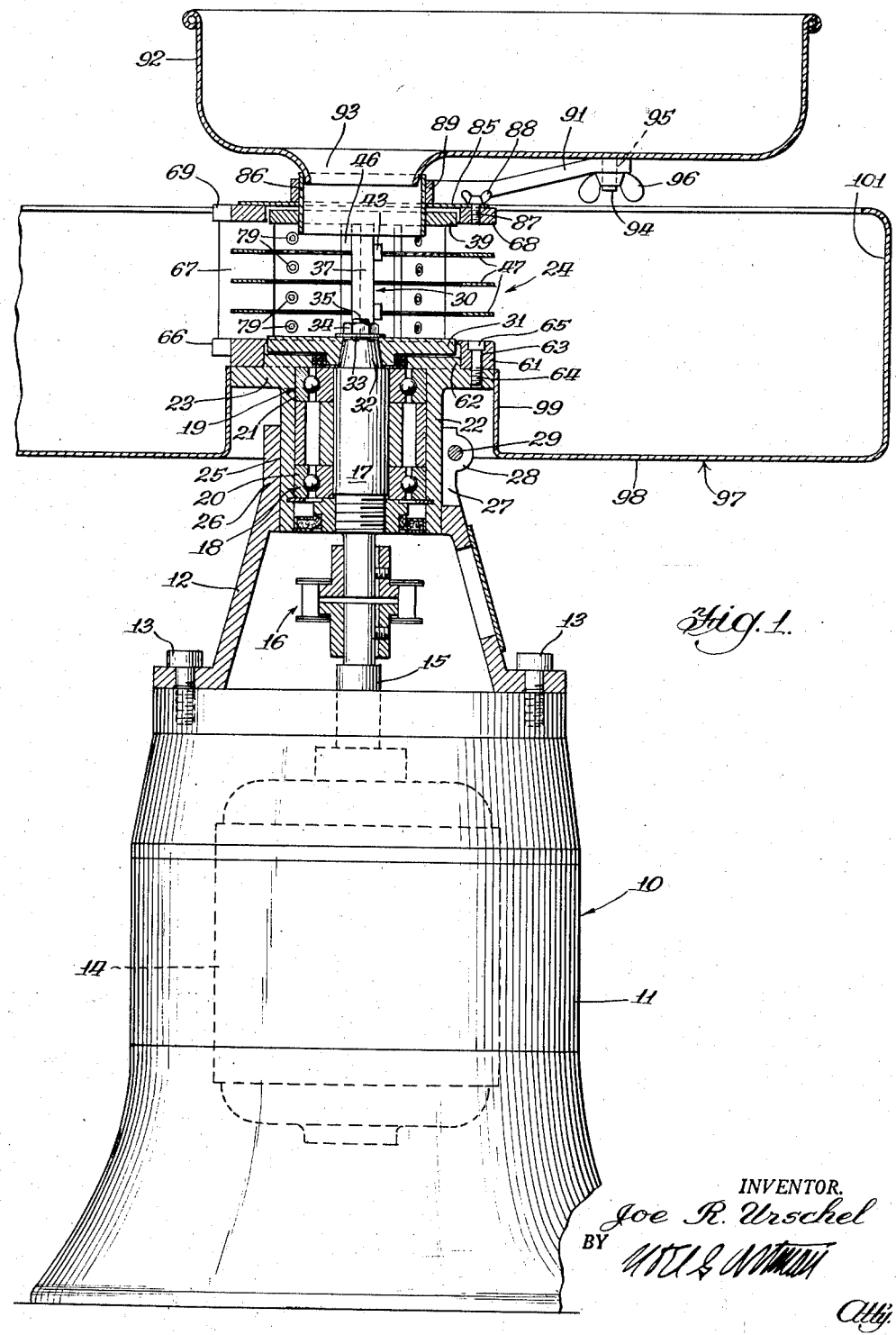
Fig. 1 is a vertical sectional view through a machine constructed in accordance with the present invention, the base of such machine being shown in elevation.

The machine comprises a hollow base 10 having a generally cylindrical lower portion 11 and a conical upper portion 12 secured to the lower portion by a circle of cap screws 13. An electric motor 14 shown by dotted lines in Fig. 1 is mounted within the base and its armature shaft 15 extends upwardly into the conical base portion 12 where a flexible coupling device 16 operably connects such shaft with a rotor shaft 17. This rotor shaft is journalled within axially spaced ball bearing units 18 and 19 of which the outer races 20 and 21 are mounted in a downwardly extending tubular portion 22 of a disc-like bottom wall 23 of a chamber 24 for receiving pieces of meat which is to be cut into fragments by the machine. The tubular bottom-wall extension 22 is inserted downwardly into the cylindrical inner periphery 25 of an axially split upper part 26 of the base portion 12, a side of this vertical split being shown at 27. Apertured ears 28 upon each side of the axial split, one being shown in Fig. 1, are drawn together by a bolt 29 for contracting the cylindrical wall 26 firmly onto the tubular bottom-wall extension.

A disc-like bottom plate 31 of a rotor 30 is secured coaxially upon a conical end portion 32 of the rotor shaft by means of a washer 33 and a nut 34 turned onto a threaded upper end portion 35 of such rotor shaft. The rotor also includes three upright blade-mounting impeller members 37 located near the circular periphery of the plate 31 and spaced apart 120 degrees about the principal axis of such plate and of the rotor shaft 17; see Fig. 3. These rotor blade-mounting impeller members are connected with the rotor bottom plate 31 by weldments 38 as shown in Fig. 3, and the upper ends of such members are connected with a flat annular upper member 39 of the rotor by similar weldments designated 41 and of which one is shown in Fig. 4. Each rotor impeller member 37 has an impeller blade 42 mounted thereon by two vertically spaced cap screws 43 extending through such members and into the respectively associated blades. Vertical cutting edges 44 respectively of these impeller blades reach the entire distance between the rotor bottom plate 31 and the upper annular member 39 of the rotor structure.

The meat or material receiving chamber 24 comprises a cylindrical lattice wall 45, Figs. 2, 3 and 4, including five longitudinal knife structures 46 extending vertically or axially of the chamber and spaced apart equidistantly circumferentially about the principal axis a—a of such chamber, which axis is seen as a point in Fig. 3. This lattice wall 45 also includes chamber-circumscribing knife structures 47 spaced apart axially of the chamber. The longitudinal knife structures have respective vertical cutting edges 48 which are interrupted by vertically spaced horizontal gaps or slots 49 which divide these cutting edges into vertically spaced sections 48a upon the inner ends of finger-like knife elements 50 which are also separated by the slots 49. There are three of the chamber-circumscribing knife structures 47, the upper of which is disposed in the uppermost slots or notches 49 of the longitudinal knife structures 46, the center chamber-circumscribing knife structure being in the center notches 49 of the longitudinal knife structures, and the lowermost knife structure 47 being disposed in the lowermost notches 49 of the longitudinal knife structures 47.

Figure 6:
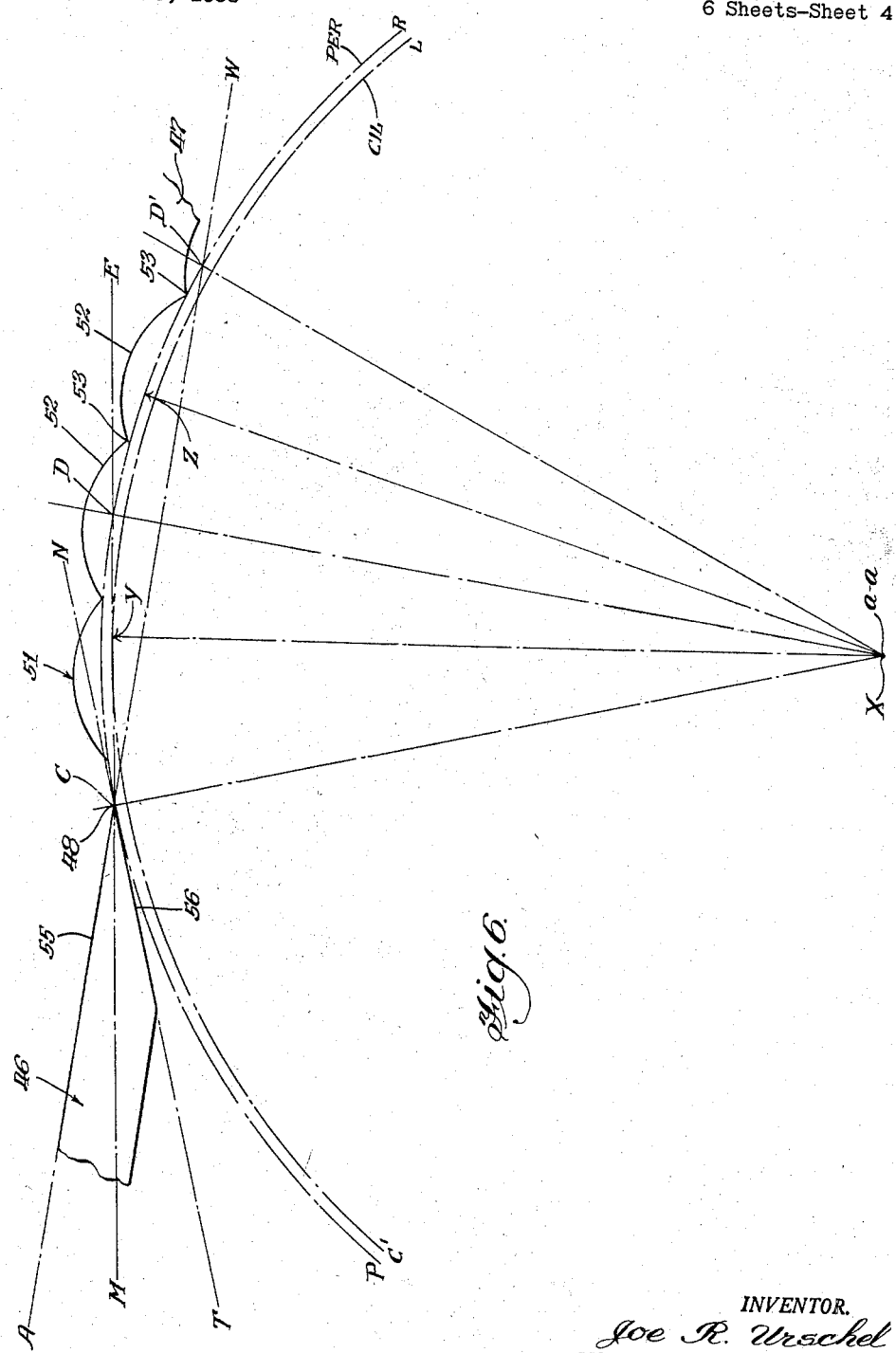
Fig. 6 is a principally diagrammatic view drawn to an enlarged scale showing a fragment of one of the longitudinal knife structures and one of the chamber-circumscribing knife structures together with lines indicating the relative positions of these two structures.

In Fig. 5 it is ascertainable that the knife structures 47 are flat annular members each having an internal cutting edge 51. These cutting edges 51 embody a succession of curved portions 52 entrained linearly of such edge. In the present embodiment these curved knife edge portions 52 are in the formation of concave scollops and the terminals of adjacent curved portions or scollops 52 are in such a degree of contiguity to create a succession of substantially pointed portions 53 of the cutting edge 51. The cutting edges 48 of the longitudinal knife structures 46 together with the internal cutting edges 51 of the chamber-circumscribing knife structures 47 collectively constitute a generally cylindrical inner periphery PER, Fig. 6, of the lattice chamber wall 45, and which inner periphery coincides with an arc PR described about the chamber axis a—a, excepting for the slight departure of the scollops 52 of the cutting edges 51; also see Figs. 3 and 5. Thus the inner periphery of the chamber wall 45 principally consists of a grid of cutting edges of which part, 51, extend circumferentially of such periphery though being spaced apart axially thereof, and of which grid-forming edges part, 48, extend axially of such periphery though being spaced apart circumferentially thereof. This intermingled or interlaced assembly of knife structures forms a plurality of discharge openings 54, Fig. 2, of which the radially inner ends are coincident with the inner periphery of the chamber wall formed by the intersecting cutting edges 48 and 51.

Each longitudinal knife structure 46 has an outer face 55 and an inner face 56 which intersect to form the cutting edge 48 thereof. A median plane MC respectively for and coincident with each of these cutting edges bisects the angle ACT, formed by the intersection of said knife structure faces 55 and 56; see Fig. 6. By examining Figs. 3 and 6 it can be ascertained that these median planes MC of the cutting edges 48, when projected along the line ME to the point Y, are substantially tangential to and are disposed in progressive succession in the same direction about a circle C'IL generated about the axis a—a of the chamber 24, an arc C'L of such circle being illustrated in Fig. 6, and the axis of such circle having a shorter radius, XY, than the radius XZ of the chamber wall inner periphery PER of which an arc extends between the points P and R in Fig. 6. Also by referring to Fig. 6 it can be determined that each of the longitudinal knife structures 46 is so disposed that the median plane MC of its cutting edge 48, when extended inwardly of the wall inner periphery PER, forms a chordal plane CD with respect to such periphery, and that such chordal plane subtends a respective chordal angle CXD of less than 180 degrees having its vertex at the chamber axis a—a.

The inner face 56 of the knife structure 46 coincides with a plane TN perpendicularly to the surface of the drawing and having a point of tangency to the chamber wall inner periphery PER at the point C which is coincident with the cutting edge 48. The outer face 55 of each knife structure 46 coincides with a plane AW disposed perpendicularly to the surface of the drawing and subtending a plane CD' chordal to the cylindrical inner periphery PER and subtending an angle CXD' of which the vertex axis is coincident with the chamber axis a—a and which spans less thna 180 degrees though exceeding the angle CXD which is subtended by the chordal plane CD.

The material receiving chamber 24 comprises an annular member 61 which rests upon the chamber bottom wall 23, Fig. 1, and is piloted about a vertical circular shoulder 62 of such bottom wall. A plurality of holes 63 spaced circumferentially about the annular member 61 align with threaded holes 64 in the bottom wall 23 wherefore cap screws 65 extending downwardly through the holes 63 and turned into the threaded holes 64 securely fasten the parts 61 and 23 together. Five ear-like projections 66 projecting radially outwardly from the annular member 61 at equal intervals about the perimeter thereof adapt this member for the support of knife supporting members 67. An upper annular member 68 of the chamber 24 is substantially congruent in horizontal contour with the lower annular member 61 and has radially projecting ears 69 respectively above the ears 66. The knife holding members 67 are disposed between the annular members 61 and 68 and each has an outer hole 71, Fig. 3, in vertical axial alignment with a bolt receiving hole 72 in the lower ear 66 associated therewith and a corresponding hole (not shown) in the upper ear 69 associated therewith. These holes of the ears 66 and 69 receive the shanks of bolts 73 which also project through the holes 71 of the knife holding members 67. When the nuts 74 of these bolts 73 are tightened the knife holding members 67 and the annular members 61 and 68 are secured together as a rigid frame for supporting the knife structures 46 and 47 of the chamber wall 45.

In addition to being transversed vertically by the bolts 73, the lower annular member 61, the upper annular member 68 and knife holding member 67 are also vertically transversed by pins 75, Fig. 3, which prevent the knife holding members pivoting about the shanks of bolts 73. These bolts 75 also pass through respective holes 76 of the annular knife structures 47; see Fig. 5.

Each of the knife supporting or holding members 67 has a vertically extending flange 77 at its outer end and extending perpendicular to a flat knife structure engaging face 78 of such supporting member. The knife structures 46 are disposed respectively against the flat faces 78 of the knife holding members 67 as illustrated in Figs. 2 and 3 where such knife structures are held by vertically spaced socket headed bolts 79 shown by dotted lines in Fig. 3 having their shanks extending through the members 67 and into elongated countersunk bores 81 respectively in the knife elements 50 of the knife structures. Nuts 82 within the elongated recesses 81 are adapted to tighten on to the shanks of the bolts 79 for clamping the knife structures 46 tightly against the faces 78 of the knife holding members 67 when the bolts are rotated from the opposite side of such members 67. When the bolts 79 are rotated to loosen the nuts 82 thereon the knife structures 46 can be adjusted horizontally along the face 78 by means of socket headed cap screws 83 disposed in threaded holes 84 in the knife holding member flanges 77. When the adjustment is made so the cutting edges 48 of the knife structures 46 coincide with the inner periphery PER, Fig. 6, of the circumferential knives 47, the bolts 79 will be turned for maintaining this adjustment. A new adjustment will be made subsequent to removal and sharpening of the knife structures 46 and attendant to their replacement. These knife structures are so disposed that their cutting edges 48 register circumferentially of the cutting edges of the knives 47 respectively with points T, Fig. 5, on the knife cutting edge portions R disposed between the groups of concave scollops 52 in the knife edges. These knife edge portions R are disposed respectively contiguous to the inner beveled faces 56 of the knife structures 46 as shown in Fig. 2.

A flat annular flange 85 of a feed tube 86 for the chamber 24 rests upon the upper face of the upper annular member 68 and is detachably held thereto by studs 87 anchored in the member 68 and projecting upwardly through holes in the flange where wing nuts 88 are turned onto said studs. That portion of the tube 86 above the flange 85 serves as a mounting for a hub 89 of a bracket 91 in support of a feed hopper 92 having a funnelled discharge opening 93 communicating into the feed tube. A stud 94 projecting downwardly from the bottom of the hopper 92 extends through a hole 95 in the bracket 91 and is secured thereto by a wing nut 96.

A receiver 97 for the processed product discharged from the chamber 24 comprises a bottom wall 98 with an up-standing inner annular flange 99 detachably mounted about the circular outer periphery of the chamber bottom wall 23. An up-standing outer wall 101 of the receiver 97 is spaced radially outwardly from the material receiving chamber 24.

*Operation of the machine*

After the electric motor 14 has been started and the rotor 40 brought up to the desired operating speed, chunks of meat are fed from the hopper 92 downwardly through the opening 93 and tube 86 into the material-receiving or rotor chamber 24. These meat chunks, one being shown at 105 in Figs. 7 through 12, are propelled by the revolving rotor members 37 and the blades 42 thereon circumferentially within the chamber 24. Centrifugal force on the meat chunks presses them against the scalloped knife edges 51 while the impeller slides the chunks on such edges for cutting the chunks into vertically spaced portions 106, the uppermost appearing in Figs. 7 through 12, that bulge radially outwardly between the circumscribing knife structures 47. The chunk 105 is shown associated with one of the three impeller members 37 which has been further designated AA to distinguish it from the other two impeller members which have been further respectively designated BB and CC.

As the rotor rotates counterclockwise the impeller member AA, in revolving from the Fig. 7 position to the Fig. 8 position, presses the chunk 105 against the cutting edge 48 of the longitudinal knife structure 46 with which it will next arrive in registry and in this manner causes this cutting edge to cut into the chunk in the process of severing the vertically spaced bulging portions 106 therefrom. In the next operating phase shown in Fig. 9 the cutting edge 44 of the impeller blade 42 on the member AA has just moved past the cutting edge 48 of the proximate knife structure 46, and as these cutting edges 44 and 48 reached registration they cooperated to completely shear the stew portions 106 from the chunk 105. To assure complete severance of the portions 106 from the chunks 105 the clearance between the shearing edges 44 and 48 is close, preferably in the nature of .003".

During movement of the impeller AA from the Fig. 7 position to the Fig. 9 position the bulging portions 106 were moving curvilinearly at substantially the same speed therewith, wherefore the inertia in these portions when severed in Fig. 9 causes them to discharge from the machine along a flight path TG, Figs. 9 through 12, until stopped by the product receiver wall 101, Fig. 1. These severed stew positions 106 discharge from the lattice wall 45 of the chamber 24 through respective of the discharge openings 54, Fig. 2.

In Fig. 9 it can be seen that as soon as the meat chunk 105 passes the proximate cutting edge 48, such chunk as it slides along the internal cutting edges 51 of the knife structures 47 is immediately cut into thereby to commence the formation of a succeeding group of vertically spaced bulging portions 106 which develop in successive stages of which two are shown in Figs. 10 and 11, and are finally sheared off from the residue of chunk 105 by the cutting edge 48 of the succeeding longitudinal knife structure in cooperation with the cutting edge 44 carried by the impeller member AA.

By providing the curved portions 52 and the points 53 in the cutting edges 51, the portions of the meat contacting these cutting edges have an incidence angle of collision with parts of the cutting edges in proximity to said points. This enhances the ability of the cutting edges 51 to penetrate the meat wherefore the machine can continue operation until a greater degree of dullness develops for these edges than if they conformed to smooth circles. Coarsely scalloped edges 51 of the proportions shown in the drawings avoid cutting miniature meat particles that cling thereto and accrete into an encrustation as has been found to be the case with saw tooth knife edges. Circumferential knives with the edges 51 are scoured clear of meat fragments by the meat rubbing thereagainst, and when these edges 51 are associated with the edges 48 of the longitudinal knife structures 46 in the manner illustrated the entire lattice wall 45 of the chamber 24 tends to remain free of meat particle accumulation during operation of the machine at proper speed.

An examination of Figs. 7 through 12 will reveal that during operation of the machine, the cutting edges 48 of the longitudinal knife structures 46 are progressively and alternately registered in shearing relation by individual of the revolved cutting edges 44.

This can be verified by reference to Figs. 7 through 12. In Fig. 7 it is ascertainable that the rotor impeller 37 which has been further designated BB to distinguish it from the other two impellers respectively further designated CC and AA, has just passed, in a counterclockwise direction, the position wherein the cutting edge 44 of the knife 42 thereon registered with the cutting edge 48 of the longitudinal knife structure 46 in the 10 o'clock position. The knife cutting edge 44 carried by the impeller member CC next passes the cutting edge of the knife structure 46 at the 5 o'clock position as the rotor advances from the Fig. 7 position to the Fig. 8 position. As the rotor advances from the Fig. 8 position to the Fig. 9 position the cutting edge 48 associated with the impeller member AA arrives in registry with the knife structure 46 approximately at the 12 o'clock position. As the rotor advances further from the Fig. 9 position to the Fig. 10 position the impeller member BB causes its associated cutting edge 44 to traverse the cutting edge of the knife structure 46 which is approximately at the 8 o'clock position. As the rotor advances from the Fig. 10 position to the Fig. 11 position the impeller member CC causes its associated cutting edge 44 to sweep through a position of registration from the cutting edge of the knife structure 46 at approximately the 3 o'clock position, as the rotor advances from the Fig. 11 position to the Fig. 12 position the impeller element AA causes its associated cutting edge 44 to sweep past the cutting edge of the knife structure 46 at approximately the 10 o'clock position. At this time the impeller element CC arrives at the same position that the impeller element AA occupies in Fig. 7; the rotor has completed 120 degrees of rotation, and during each succeeding 120 degrees of rotation there will be a repetition of the above described cycle in which the knives carried by the impeller elements 37 individually and progressively registered with cutting edges of alternate knife structures 46. This action assures that shearing action never occurs simultaneously at two or more cutting edges 48, and thereby avoids load peak impulses excessive in amplitude. The resulting load characteristic of increased load peak frequency but of lower peak amplitude is attained by distributing the knife edges 44 and 48 equiangularly about the chamber axis a—a and making the number of edges 44 non-aliquot to the number of edges 48.

In an actual reduction to practice of the invention, the machine constructed as illustrated in the drawings had a rotor chamber 6.5" in diameter at its inner periphery, and 4.0" deep. The circumferential knife structures 47 were spaced apart 1.0", the upper of these knife structures being spaced 1.0" below the upper ends of the longitudinal knife structures 46, and the lowermost of the circumferential knife structures being spaced 1.0" above the lower ends of the longitudinal knife structures. The vertical cutting edges 44 on the blades 42 carried by the impeller members 37 preferably have a clearance of approximately .003" with respect to the vertical cutting edges 48 of the longitudinal knife structures 46. The rotational speed of the rotor 30 is not critical and has been operated within the speed range of 1320 R. P. M. down to 295 R. P. M. However better performance is obtained from the machine when operated at speeds above the lower limit of this speed range. At this lower speed the pieces in the finished product are somewhat smaller than at faster rotor speeds and the cut pieces do not discharge as freely through the chamber side wall. The higher speeds also diminish the friction incurred between the meat and the knives and reduces the power required to drive the machine.

When the machine was placed in operation chunks of meat varying in size up to about 1.5 lbs. were placed in the hopper 92 and fed downwardly through the funnelled opening 93 into the chamber 24. The rotor blade-carrying impellers 37 engaged the meat and propelled it about the inner periphery of the cylindrical lattice wall 45. The internal cutting edges 51 of the circumferential knives cut the meat pieces to thickness corresponding to the vertical spacing of these knives, and the pieces of the finished product were cut to random length depending somewhat upon the shape and size of the chunks fed into the rotor chamber.

Because of the inner periphery of the chamber wall 45 being formed substantially entirely of cutting edges, there is very little resistance to the meat being cut into fragments wherefore the meat essentially flows through the machine at the rate it is fed into the chamber, and very little power is required to drive the machine. A machine of the dimensions described above, driven by a 5 H. P. motor, was operated for cutting meat chunks into stew meat pieces at the rate of approximately seven tons per hour without observable slow-down of the machine, the limit of capacity being determined at that time by the rate at which the meat could be fed through the funnelled opening 93.

Having described a single preferred form of the invention with the view of clearly and concisely illustrating the same, I claim:

1. In a machine for cutting sliceable material into fragments, a material receiving chamber comprising a cylindrical lattice wall including longitudinal knife structures spaced apart circumferentially about the principal axis of the chamber, and chamber-circumscribing knife structures spaced apart axially of the chamber, said knife structures having respective cutting edges collectively constituting the inner periphery of the lattice wall, and the longitudinal structures being disposed with median planes of their cutting edges substantially tangential to and in progressive succession in the same direction about a circle generated about said axis but of shorter radius than the wall inner periphery.

2. In a machine for cutting sliceable material into fragments, a material receiving chamber comprising a cylindrical lattice wall including longitudinal knife structures spaced apart circumferentially about the principal axis of the chamber, and chamber-circumscribing knife structures spaced apart axially of the chamber, said knife structures having respective cutting edges collectively constituting the inner periphery of the lattice wall, and the longitudinal structures being disposed with median planes of their cutting edges extending inwardly of the wall inner periphery to form chordal planes with respect to such periphery successively in one direction circumferentially thereof, and which chordal planes subtend respective chordal angles each having its vertex at said axis and spanning less than 180 degrees.

3. The combination set forth in claim 2, wherein the cutting edges of the circumscribing knife structures embody a succession of curved portions entrained linearly thereof.

4. The combination set forth in claim 2, wherein the cutting edges of the circumscribing knife structures embody a succession of concave scallops entrained linearly thereof.

5. The combination set forth in claim 4, wherein the terminals of adjacent scallops are in a degree of contiguity to create a succession of substantially pointed portions in the circumferential cutting edges.

6. In a machine for cutting sliceable material into fragments, a material receiving chamber comprising a cylindrical lattice wall including a set of longitudinal knife structures spaced apart circumferentially about the principal axis of the chamber, and a set of chamber-circumscribing knife structures spaced apart axially of the chamber, said knife structures having respective cutting edges collectively constituting the inner periphery of the lattice wall, the cutting edges of structures in one of said sets being interrupted by gaps, there being structures of the other of said sets disposed within said gaps to dispose said sets of structures in intermingled assembly, means for holding the sets of knife structures in such assembly, the longitudinal structures being disposed with median planes of their cutting edges extending inwardly of the wall inner periphery to form chordal planes with respect to such periphery successively in one direction circumferentially thereof, and which chordal planes subtend respective chordal angles each having its vertex at said axis and spanning less than 180 degrees.

7. In a machine for cutting sliceable material into fragments, a material receiving chamber comprising a cylindrical lattice wall including a set of longitudinal knife structures spaced apart circumferentially about the principal axis of the chamber, and a set of chamber-circumscribing knife structures spaced apart axially of the chamber, said knife structures having respective cutting edges collectively constituting the inner periphery of the lattice wall, the knife structures in one of said sets comprising knife elements having respective portions of the cutting edges of such structures thereon, said knife elements being spaced apart lengthwise of the cutting edge portions thereon, the knife structures of the other set being inserted within the spaces between such knife elements to occupy a stacked relation therewith, means for holding such knife elements and inserted knife structures in the stocked assembly, the longitudinal structures being disposed with median planes of their cutting edges extending inwardly of the wall inner periphery to form chordal planes with respect to such periphery successively in one direction circumferentially thereof, and which chordal planes subtend respective chordal angles each having its vertex at said axis and spanning less than 180 degrees.

8. In a machine for cutting sliceable material into fragments, a material receiving chamber comprising a cylindrical lattice wall including a set of longitudinal knife structures spaced apart circumferentially about the principal axis of the chamber, and a set of chamber-circumscribing knife structures spaced apart axially of the chamber, said knife structures having respective cutting edges collectively constituting the inner periphery of the lattice wall, the longitudinal knife structures having notches extending through their cutting edges and into such structures radially outwardly of the chamber, said notches being spaced apart axially of the chamber and receiving respective of the chamber-circumscribing knife structures for disposing the longitudinal knife structures and the chamber-circumscribing knife structures in interlaced assembly, and means for retaining the interlaced assembly of the knife structures, the longitudinal structures being disposed with median planes of their cutting edges extending inwardly of the wall inner periphery to form chordal planes with respect to such periphery successively in one direction circumferentially thereof, and which chordal planes subtend respective chordal angles each having its vertex at said axis and spanning less than 180 degrees.

9. In a machine for cutting pieces of meat into fragments, a rotor chamber having a vertical axis and adapted to receive such meat pieces, said chamber comprising a frame including an annular bottom member coaxial with the chamber axis, an annular upper member coaxial with the chamber axis and knife supporting members extending axially of the chamber between the annular bottom and upper members with which they are in fabricated relation, said knife supporting members being spaced apart circumferentially of the chamber axis and each having vertically narrow notches spaced apart axially of the chamber and extending horizontally thereinto radially outwardly of the chamber axis, said chamber also comprising a cylindrical lattice wall including a set of longitudinal knife structures respectively mounted on said knife supporting members, and a set of chamber-circumscribing knife structures spaced apart axially of the chamber, said knife structures having respective cutting edges collectively constituting the inner periphery of the lattice wall, the longitudinal knife structures having vertically narrow notches extending horizontally thereinto through their cutting edges in respective registered relation with the notches of the knife supporting members therefor, the chamber-circumscribing knife structures being mounted in certain of the registered knife structure and knife supporting member notches respectively therefor, the longitudinal knife structures being disposed with median planes of their cutting edges extending inwardly of the wall inner periphery progressively in the same angular relation with respect thereto and to form chordal planes with respect to such periphery that subtend respective chordal angles each having its vertex at the chamber axis and spanning less than 180 degrees, and rotor means in the chamber for revolving the meat pieces centrifugally against the cutting edges.

10. The combination set forth in claim 9, wherein there is means for detachably mounting the longitudinal knife structures on said knife supporting members in selective positions radially of the chamber.

11. The combination set forth in claim 9, wherein the knife supporting members have respective mounting faces in respective planes extending axially of the chamber and chordally intersecting the cylindrical inner periphery of the chamber lattice wall, the longitudinal knife structures having respective mounting faces extending in parallelism with their cutting edges and disposed respectively mated with mounting faces of the knife supporting members, the mounting faces of the knife structures being slidable upon the supporting member mounting faces mated therewith attendant to advancement of such knife structures to place the cutting edges thereof into coincidence with the cylindrical inner periphery of the chamber wall, means on the knife supporting members for forcible advancing said knife structures, and means for pressing the mounting faces of the advanced knife structures against the supporting member faces mated therewith attendant to releasably clamping the knife structures onto said supporting members.

12. In a machine for cutting sliceable material into fragments; a material receiving chamber comprising a cylindrical lattice wall including longitudinal knife structures spaced apart circumferentially about the principal axis of the chamber, and chamber-circumscribing knife structures spaced apart axially of the chamber, said knife structures having respective cutting edges collectively constituting the inner periphery of the lattice wall, the longitudinal knife structures being disposed substantially tangentially of said periphery and presenting their cutting edges in the same direction circumferentially of said periphery, and the wall containing discharge openings communicating radially therethrough between the knife structures.

13. The combination set forth in claim 12, wherein there is a rotor within the chamber and rotatable coaxially therewith, material impeller elements upon said rotor and spaced apart circumferentially thereof, and means providing cutting edges respectively on the impeller elements, said cutting edges extending axially of the chamber substantially coterminously with the longitudinal knife structure cutting edges axially of the chamber and each being disposed to sweep successively past such longitudinal structure edges with a clearance throughout their length of about .003".

14. The combination set forth in claim 13, wherein the quantity number of impeller elements is non-aliquot to the quantitative number of longitudinal knife structures.

15. The combination set forth in claim 13, wherein the quantitative number of impeller elements and the quantitative number of longitudinal knife structures is each non-aliquot of the other.

References Cited in the file of this patent

UNITED STATES PATENTS

| 949,116 | Engle et al. | Feb. 15, 1910 |
| 1,223,254 | Burks | Apr. 17, 1917 |
| 2,719,011 | Bebinger | Sept. 27, 1955 |

FOREIGN PATENTS

| 6,171 | Great Britain | 1909 |
| 143,198 | Sweden | Dec. 1, 1953 |
| 297,755 | Switzerland | June 16, 1954 |